(12) United States Patent
Pschierer et al.

(10) Patent No.: US 8,533,180 B2
(45) Date of Patent: Sep. 10, 2013

(54) METHOD AND APPARATUS FOR ENHANCING A GEOGRAPHIC INFORMATION SYSTEM DATABASE WITH OPERATIONAL DATA

(75) Inventors: Christian Pschierer, Ochsenfurt (DE); Lisa Haskell, Monument, CO (US); Bill Lugsch, Golden, CO (US)

(73) Assignee: The Boeing Company, Chicago, IL (US)

( * ) Notice: Subject to any disclaimer, the term of this patent is extended or adjusted under 35 U.S.C. 154(b) by 509 days.

(21) Appl. No.: 11/762,450

(22) Filed: Jun. 13, 2007

(65) Prior Publication Data

US 2008/0313129 A1 Dec. 18, 2008

(51) Int. Cl.
*G06F 7/00* (2006.01)
*G06F 17/30* (2006.01)

(52) U.S. Cl.
USPC .......................................... 707/717; 707/749

(58) Field of Classification Search
USPC ...... 707/200, 100, 3, 101, 714, 737, 999.102, 707/717, 749; 342/357.06; 348/169; 701/123, 701/200, 208, 212, 120, 209, 300, 451, 532, 701/533; 715/810, 808, 766; 705/5
See application file for complete search history.

(56) References Cited

U.S. PATENT DOCUMENTS

| | | | |
|---|---|---|---|
| 6,247,019 | B1 | 6/2001 | Davies |
| 6,408,307 | B1 | 6/2002 | Semple et al. |
| 6,707,421 | B1 | 3/2004 | Drury et al. |
| 6,968,271 | B1 | 11/2005 | Wolfson |
| 7,072,963 | B2 | 7/2006 | Anderson et al. |
| 7,085,630 | B2 | 8/2006 | Ryan et al. |
| 7,091,970 | B2 | 8/2006 | Cutlip |
| 7,147,938 | B2 | 12/2006 | Helber et al. |
| 7,228,316 | B2 | 6/2007 | Gutierrez et al. |
| 7,366,736 | B1 * | 4/2008 | Woodard ................... 707/104.1 |
| 7,464,096 | B2 * | 12/2008 | Evans et al. ................... 707/100 |
| 7,477,145 | B2 | 1/2009 | Tatton et al. |

(Continued)

FOREIGN PATENT DOCUMENTS

EP 1930817 A1 6/2008

OTHER PUBLICATIONS

"Airport Mapping Database Data Dictionary Supplement to DO272A Specification", Jeppesen, Oct. 2006, pp. 1-147.

(Continued)

*Primary Examiner* — Jacob F Bétit
*Assistant Examiner* — Bao G Tran
(74) *Attorney, Agent, or Firm* — Yee & Associates, P.C.

(57) ABSTRACT

A computer implemented method, apparatus, and computer usable program code for providing data about an airport from an airport mapping database. A first set of elements are stored in the airport mapping database, wherein the first set of elements are visible objects and are identified using a set of geometric features. A second set of elements are stored in the airport mapping database, wherein the second set of elements are non-visible objects and are identified using the set of geometric features. A first element from the first set of elements is associated with a second element in the second set of elements based on an operational relationship between the first element and the second element. A responsive set of elements containing one element from the first set of elements and another element from the second set of elements based on associations between elements in the first set of elements and the second set of elements are returned in response to a query.

10 Claims, 3 Drawing Sheets

(56) References Cited

U.S. PATENT DOCUMENTS

| | | | |
|---|---|---|---|
| 7,641,986 B2 | 1/2010 | Lo et al. | |
| 7,761,195 B2 | 7/2010 | Dwyer | |
| 7,966,125 B2 | 6/2011 | Wipplinger et al. | |
| 8,032,265 B2 | 10/2011 | He | |
| 8,296,335 B2 | 10/2012 | Bouve et al. | |
| 2002/0032674 A1* | 3/2002 | Semple et al. | 707/3 |
| 2002/0169541 A1* | 11/2002 | Bouve et al. | 701/200 |
| 2003/0191688 A1* | 10/2003 | Prince et al. | 705/14 |
| 2004/0036649 A1* | 2/2004 | Taylor | 342/357.06 |
| 2004/0036688 A1 | 2/2004 | Cutlip | |
| 2004/0073571 A1 | 4/2004 | Kumhyr et al. | |
| 2004/0078367 A1 | 4/2004 | Anderson et al. | |
| 2004/0225432 A1 | 11/2004 | Pilley et al. | |
| 2004/0230595 A1 | 11/2004 | Gutierrez et al. | |
| 2005/0116622 A1 | 6/2005 | Lo et al. | |
| 2005/0187677 A1 | 8/2005 | Walker | |
| 2005/0200501 A1 | 9/2005 | Smith | |
| 2005/0261814 A1 | 11/2005 | Ryan et al. | |
| 2006/0003183 A1 | 1/2006 | Helber et al. | |
| 2006/0229058 A1 | 10/2006 | Rosenberg | |
| 2007/0005199 A1 | 1/2007 | He | |
| 2007/0027903 A1 | 2/2007 | Evans et al. | |
| 2007/0156635 A1* | 7/2007 | Tatton et al. | 707/1 |
| 2008/0125960 A1 | 5/2008 | Wipplinger et al. | |
| 2008/0140727 A1 | 6/2008 | Pschierer | |
| 2009/0089324 A1* | 4/2009 | Dwyer | 707/104.1 |

OTHER PUBLICATIONS

"ARINC Embedded Interchange Format for Airport Mapping Database, Arinc Specification 816", Apr. 28, 2006, Aeronautical Radio Inc., pp. 1-93.
"User Requirements for Aerodrome Mapping Information", RTCA DO-272A, Aug. 3, 2005, RTCA, Inc. pp. 1-153.
U.S. Appl. No. 11/608,129, filed Dec. 7, 2006, Pschierer.
USPTO office action dated Oct. 19, 2009 for U.S. Appl. No. 11/608,129.
USPTO Final office action for U.S. Appl. No. 11/608,129 dated Aug. 17, 2010.
European Search Report, dated Apr. 3, 2008, regarding Application No. EP07023535 (EP1930817), 2 pages.
Brunner et al., "Carbazole Compounds as Host Materials for Triplet Emitters in Organic Light-Emitting Diodes: Tuning the HOMO Level without influencing the Triplet Energy in Small Molecules", Journal of the American Chemical Society, vol. 126, Apr. 2004, pp. 6035-6042.
Burnell et al., "Synthesis and Electrooptical Properties of Copolymers Derived from Phenol-Functionalized Telechelic Oligofluorenes", Macromolecules, vol. 38, Nov. 2005, pp. 10667-10677.
Grothe, "Study on the applicability of the xNOTAM concept for updating Airport Mapping Database (AMDB) applications", presented at AIXM 5 Public Design Review, Feb. 2006, 12 pages. Retrieved from http://www.aixm.aero/gallery/content/public/design_review/03b_case_studies_amdb_xnotam.pdf.
Hebert et al., "Oracle8i Spatial User's Guide and Reference", Oracle Corporation, Feb. 1999, 110 pages.
Jensen et al., "Temporal Data Management", IEEE Transactions on Knowledge and Data Engineering, vol. 11, No. 1, Jan./Feb. 1999, pp. 36-44.
Khatri et al., "On augmenting database design-support environments to capture the geo-spatio-temporal data semantics", Information Systems, vol. 31, Iss. 2, Apr. 2006, pp. 98-133.
Klapars et al., "A General and Efficient Copper Catalyst for the Amidation of Aryl Halides and the N-Arylation of Nitrogen Heterocycles", Journal of the American Chemical Society, vol. 123, Aug. 2001, pp. 7727-7729.
Koene et al., "Asymmetric Triaryldiamines as Thermally Stable Hole Transporting Layers for Organic Light-Emitting Devices", Chemistry of Materials, vol. 10, No. 8, Aug. 1998, pp. 2235-2250.
Louie et al., "The Largest Discrete Oligo(m-aniline). An Exponential Growth Strategy Using Palladium-Catalyzed Amination of Aryl Sulfonates", Macromolecules, vol. 31, No. 19, Oct. 1998, pp. 6737-6739.
Pornphol et al., "A Temporal Relational and Object Relational Database Design Technique", Proceedings of IEEE SouteastCon, Mar. 2004, pp .54-59.
Ravada et al., "Oracle8i Spatial: Experiences with Extensible Databases", Proceedings of the 6th International Symposium on Advances in Spatial Databases (SDD '99), Lecture Notes in Computer Science vol. 1651, Jul. 1999, pp. 355-359.
Snodgrass, "Managing Temporal Data: A Five-Part Series", TimeCenter Technical Report TR-28, Sep. 1998, 39 pages.
Yang et al., "Highly Efficient Single-Layer Polymer Electrophospherescent Devices", Advanced Materials, vol. 16, No. 2, Jan. 2004, pp. 161-166.
USPTO Office Action dated Oct. 3, 2008 regarding U.S. Appl. No. 11/608,129, 28 pages.
USPTO Final Office Action dated Feb. 23, 2009 regarding U.S. Appl. No. 11/608,129, 20 pages.
USPTO Final Office Action dated Apr. 30, 2009 regarding U.S. Appl. No. 11/608,129, 21 pages.
USPTO Final Office Action dated Feb. 5, 2010 regarding U.S. Appl. No. 11/608,129, 21 pages.
USPTO Office Action dated Aug. 17, 2010 regarding U.S. Appl. No. 11/608,129, 23 pages.
USPTO Final Office Action dated Feb. 7, 2011 regarding U.S. Appl. No. 11/608,129, 15 pages.

* cited by examiner

METHOD AND APPARATUS FOR ENHANCING A GEOGRAPHIC INFORMATION SYSTEM DATABASE WITH OPERATIONAL DATA

BACKGROUND INFORMATION

1. Field

The present disclosure relates generally to an improved data processing system and in particular to a method and apparatus for processing geographic data. Still more particularly, the present disclosure relates to a computer implemented method, apparatus, and computer usable program code for enhancing a geographic information system database with operational data.

2. Background

Geographic information system databases contain data representing real world objects, such as, roads, land use, and elevation, using digital data. This data may relate information about a real world object to a digital representation of the real world object. For example, a digital image of a runway at an airport may be used to generate a map of the runway. The map may be generated through other input, such as measurements of the runway. Additionally, a dataset consisting of a geometry, such as a runway polygon, may be associated with information, such as elevation, surface material or pavement strength. This information is also referred to as "attributes", which may be stored in a database that may be queried as well as analyzed.

Database systems have been developed using these models. The databases are often referred to as airport mapping databases (AMDBs). Airlines, traffic controllers, pilots, and other entities use the information from these databases in moving map displays or for identifying certain properties of different aeronautical elements, such as an open/closed attribute value or a maximum wingspan for an aircraft on runways and taxiways.

Airport mapping databases have been developed for use with synthetic vision systems and other similar applications. A synthetic vision system is a set of technologies that provides pilots with clear and intuitive means for understanding their flying and taxiing environment. A synthetic vision system provides one or more displays to help increase pilot situational awareness. Airport mapping databases contain data in which the data capture process is based on digital photogrammetry from satellite imagery.

Currently, obtaining other types of information about an airport occurs from other sources because airport mapping databases are only an electronic representation of real world airport objects. As a result, increased time is required by pilots and aircraft crew to obtain information about airports.

SUMMARY

The different advantageous embodiments provide a computer implemented method, apparatus, and computer usable program code for providing data about an airport from an airport mapping database. A first set of elements are stored in the airport mapping database, wherein the first set of elements are visible objects and are identified using a set of geometric features. A second set of elements are stored in the airport mapping database, wherein the second set of elements are non-visible objects and are identified using the set of geometric features. A first element from the first set of elements is associated with a second element in the second set of elements based on an operational relationship between the first element and the second element. A responsive set of elements containing one element from the first set of elements and another element from the second set of elements based on associations between elements in the first set of elements and the second set of elements are returned in response to a query.

In another advantageous embodiment, a geographic information system database is managed. An update containing data relating to a set of elements is received, wherein the data includes data relating to a non-visible attribute and a geometric feature. The set of elements in the geographic information system mapping database is located using the geometric feature. The set of elements is updated with the non-visible attribute.

Different advantageous embodiments also may provide a computer program product including a computer usable medium having computer usable program code for providing data about an airport from an airport mapping database. The computer usable medium includes computer usable program code for storing a first set of elements in the airport mapping database, wherein the first set of elements are visible elements and are identified using a set of geometric features. Computer usable program code is present for storing a second set of elements in the airport mapping database, wherein the second set of elements are non-visible elements and are identified using the set of geometric features. The computer usable medium has computer usable program code for associating a first element from the first set of elements with a second element in the second set of elements based on an operational relationship between the first element and the second element. Computer usable program code is present for returning a responsive set of elements containing one element from the first set of elements and another element from the second set of elements based on associations between elements in the first set of elements and the second set of elements in response to a query.

Another advantageous embodiment includes a data processing system comprising a bus, a communications unit connected to the bus, a storage device connected to the bus, in which the storage device includes a computer usable program code, and a processor unit connected to the bus. The processor unit executes the computer usable program to store a first set of elements in the airport mapping database, wherein the first set of elements are visible objects and are identified using a set of geometric features; store a second set of elements in the airport mapping database, wherein the second set of elements are non-visible objects and are identified using the set of geometric features; associate a first element from the first set of elements with a second element in the second set of elements based on an operational relationship between the first element and the second element; and return a responsive set of elements containing one element from the first set of elements and another element from the second set of elements based on associations between elements in the first set of elements and the second set of elements in response to a query.

The features, functions, and advantages can be achieved independently in various embodiments of the present invention or may be combined in yet other embodiments in which further details can be seen with reference to the following description and drawings.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an advantageous embodiment of the present invention when read in conjunction with the accompanying drawings, wherein:

DETAILED DESCRIPTION

Figure 1:
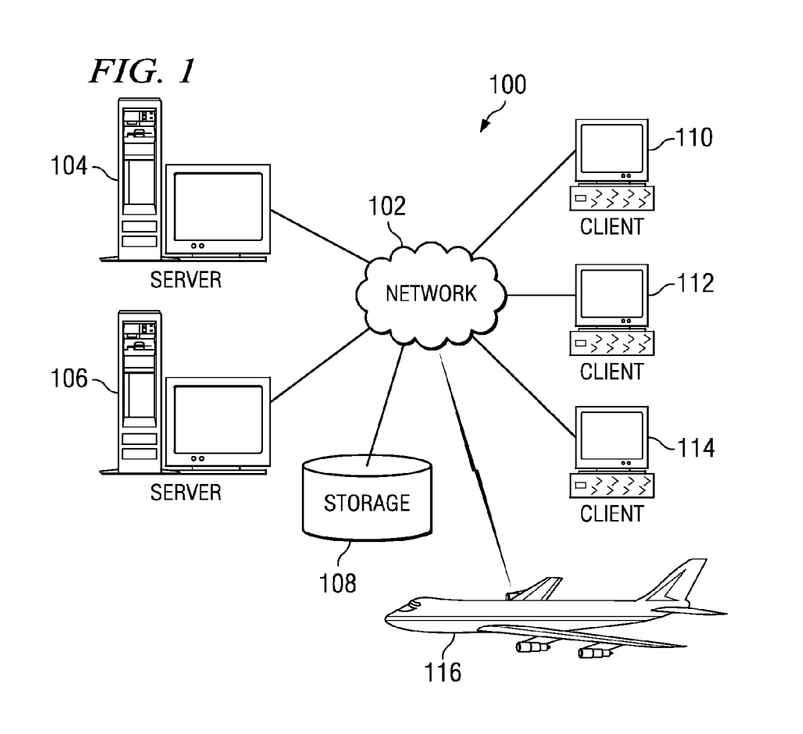
FIG. 1 is a pictorial representation of a network of data processing systems in which the advantageous embodiments of the present invention may be implemented.
Figure 2:
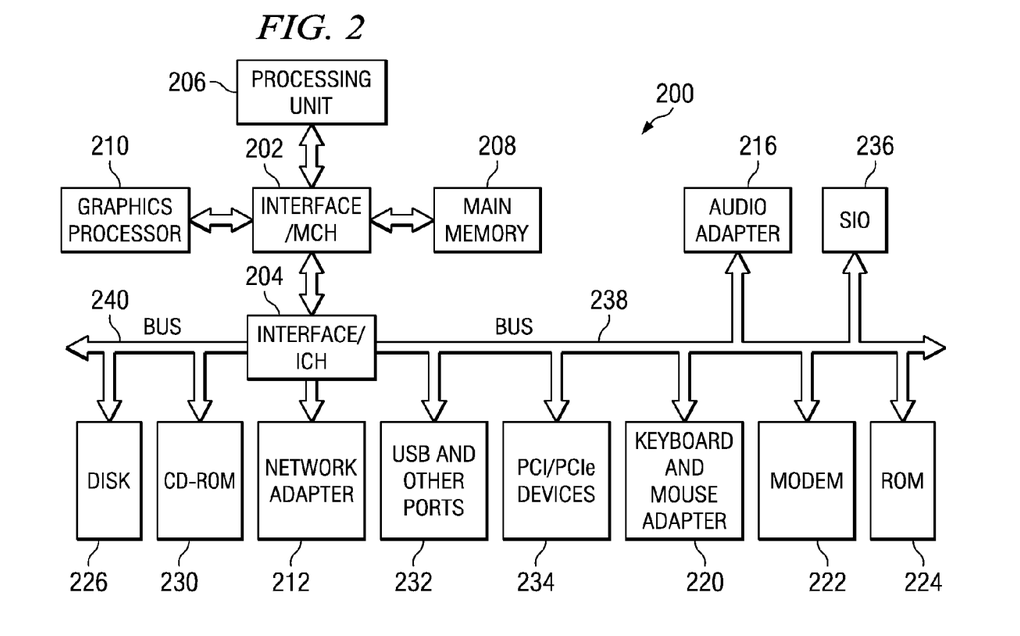
FIG. 2 is a block diagram of a data processing system in which the advantageous embodiments of the present invention may be implemented.

With reference now to the figures, and in particular with reference to FIGS. 1-2, exemplary diagrams of data processing environments are provided in which the advantageous embodiments of the present invention may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which the advantageous embodiments of the present invention may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In this example, aircraft 116 also is a client that connects to network 102 using a wireless connection. In the depicted example, server 104 provides data, such as boot files, operating system images, and applications to clients 110, 112, and 114. Clients 110, 112, and 114 are clients to server 104 in this example. In these examples, server 104, server 106, client 110, client 112, and client 114 may be computers in an airport or network of airports in which servers 104 and 106 contain airport mapping databases used by the clients. Network data processing system 100 may include additional servers, clients, and other devices not shown.

Additionally, aircraft 116 also may receive information from server 104 or 106 through a wireless communications link (in-flight) or any other data link on the ground. Alternatively, aircraft 116 may include an airport mapping database and receive updates from servers 104 and 106 for guarding changes in conditions of different aeronautical elements.

In the depicted example, network data processing system 100 is the Internet with network 102 representing a worldwide collection of networks and gateways that use the Transmission Control Protocol/Internet Protocol (TCP/IP) suite of protocols to communicate with one another. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which the advantageous embodiments of the present invention may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including interface and memory controller hub (MCH) 202 and interface and input/output (I/O) controller hub (ICH) 204. Processing unit 206, main memory 208, and graphics processor 210 are coupled to interface and memory controller hub 202. Processing unit 206 may contain one or more processors and even may be implemented using one or more heterogeneous processor systems. Graphics processor 210 may be coupled to the MCH through an accelerated graphics port (AGP), for example.

In the depicted example, local area network (LAN) adapter 212 is coupled to interface and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to interface and I/O controller hub 204 through bus 238, and hard disk drive (HDD) 226 and CD-ROM drive 230 are coupled to interface and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to interface and I/O controller hub 204.

An operating system runs on processing unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200. Java and all Java-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in interface and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The different advantageous embodiments recognize that providing information only about visible elements in images in an airport mapping database makes it more difficult for pilots and other users to obtain information needed to perform different operations at an airport. Thus, the different advantageous embodiments recognize that it would be desirable to add additional information about non-visible elements to airport mapping databases to increase the usability of these types of databases.

The different illustrative embodiments provide for integration of operational data within visible elements in an airport mapping database. Operation data is data that provides information about different elements at an airport in which this data is not visible in an image.

In some advantageous embodiments, data about an airport is provided from an airport mapping database by storing a first set of elements in the airport mapping database. The first set of elements is a set of visible elements and is identified using a set of geometric features. The set of geometric features is a set of one or more geometric features. A second set of elements are stored in the airport mapping database in which the second set of elements are non-visible elements and are identified using a set of geometric features. A first element in the first set of elements is associated with a second element in the second set of elements based on an operational relationship between the first element and the second element. A responsive set of elements, containing one element from the first set of elements and another element from the second set of elements based on associations between the elements in the first set of elements and the second set of elements, are returned in response to a query.

The different advantageous embodiments provide a computer implemented method, apparatus, and computer usable program code for receiving an update containing data relating to a set of elements. This set of elements is a set of one or more elements. The data includes data relating to a non-visible element in a geometric feature. The set of elements is located in a geographic information system mapping database using the geometric feature. The set of elements are then updated using the non-visible element.

In these examples, an operational relationship between a first element and a second element is a relationship in which one element is a non-visible element that provides information about the other element, which is a visible element. For example, with a taxiway intersection, information may be associated with the visible element, the intersection, to let a pilot know which way an aircraft may turn at the intersection if a turn is to occur. As another example, in a parking stand area, an element showing a parking stand may have information about parking positions associated with it. This information is located in a second non-visible element that is associated with the visible element, the parking stand.

Further, the operational relationship may be with more than one element. For example, an allowable turning direction or runway incursion may be associated with all of the elements that make up the runway, not just an intersection for the taxiway or runway. Also, these elements making up the runway may be combined to form a new element. A turning direction or runway incursion has an operational relationship with an element, such as a runway, which is formed from different elements of the runway. This element for a runway is also referred to as a container.

Figures 3, 4:
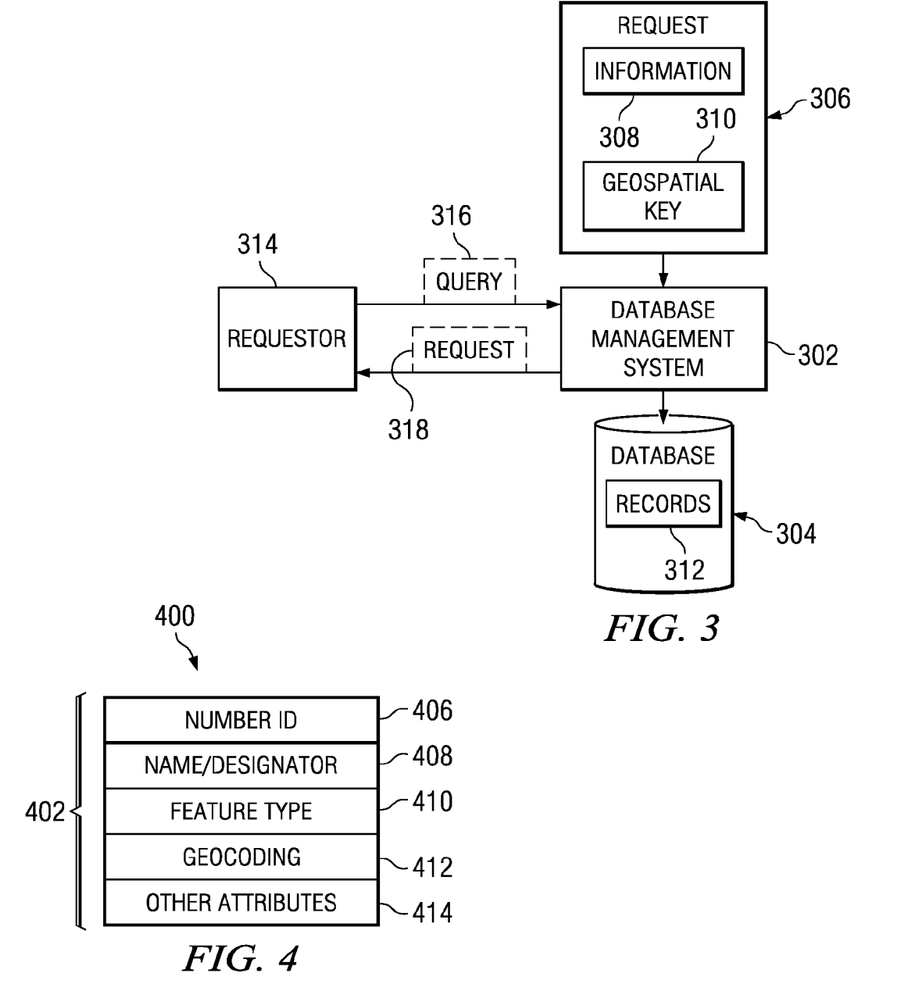
FIG. 3 is a diagram illustrating a geographic information system database in accordance with an advantageous embodiment of the present invention.
FIG. 4 is an example of a record in accordance with an advantageous embodiment of the present invention.

Turning now to FIG. 3, a diagram illustrating a geographic information system database is depicted in accordance with an advantageous embodiment of the present invention. In this example, the database takes the form of airport mapping database 300, which includes database management system 302 and geo-database 304. Database management system 302 is software designed to manage geo-database 304. Database management system 302 may perform various operations on geo-database 304. For example, database management system 302 may be used to create geo-database 304 or to add or update data within geo-database 304. Geo-database 304 is a collection of records or information organized in a manner that may be queried or analyzed.

In these examples, geo-database 304 contains information for both visible elements and non-visible elements. Examples of visible elements include runways, taxiways, intersection, parking stands, and helipads. Examples of non-visible elements that have operational relationships to visible elements include runway incursion hotspots, surface information, thresholds, parking stand position directions, parking stand push back directions, allowed turns that may be made, and colors of stop light bars. This information is in contrast to the currently available airport mapping databases, in which only visible elements are provided. Further, the non-visible elements in these illustrative embodiments are elements that also have no physical aspect.

In these examples, database management system 302 receives request 306, which may be an update to a set of elements stored in records within geo-database 304. Request 306 also may be a request to add one or more elements to geo-database 304. This set of elements contains one or more elements. The update may add or change information. Request 306 contains information 308.

When request 306 is in the form of an update, request 306 also contains geospatial key 310. This information is used to uniquely identify an element in a record stored in geo-database 304. Geospatial key 310 uses a geometric feature to identify an element. This geometric feature may be, for example, a point, a line, or a polygon. In these examples, the point, the line, or the polygon is defined using coordinates, such as longitude and latitude.

Database management system 302 uses geospatial key 310 to identify one or more of records 312 in geo-database 304 to update. Information 308 also may be used in determining which records within records 312 should be updated. In this manner, geospatial key 310 provides a unique way to identify each element within records 312 in geo-database 304.

Information 308, in these examples, may contain updates to visual elements. For example, new images for visible elements, such as runway sections, taxiways, and parking stands may be received in information 308. This type of information represents visible elements stored in geo-database 304. Information 308 also may include non-visible elements. These non-visible elements, in these examples, may be stored as elements or as attributes to other elements in records 312 within geo-database 304.

For example, information 308 in request 306 may contain a new image for an element in the form of a parking stand. Geospatial key 310 contains the geometric feature needed to identify the parking stand within records 312. By identifying the appropriate record, the old image may be replaced with the new image for this visible element. Further, with non-visible elements in information 308, geospatial key 310 may be used to identify the appropriate visible elements with which the non-visible element is to be associated. In this type of example, the non-visual element may be added to the visible element as an attribute. Alternatively, the non-visible element may be stored as a separate element in records 312.

In this manner, geo-database 304 may be created with or modified to include non-visible information in addition to visible elements using geospatial key 310. In these examples, a non-visible element is one that has an operational relationship with a visible element.

As a result, requester 314 may send query 316 to database management system 302 to obtain information from geo-database 304. One or more records, such as records 312 are retrieved and returned in request 318 by database management system 302 to requester 314. In these examples, requester 314 may be a software program or component located at an airline, air traffic control tower, or aircraft. The result of a request may be displayed in a map or other graphical display. Alternatively, this information may be used to modify processes, such as routing systems in an aircraft.

In this manner, the different advantageous embodiments may be applied in the creation of new databases. Further, the different examples may be applied to updating or modifying existing databases to include the non-visible elements. In these examples, the non-visible elements are ones that have operational relationships with the visible elements.

Turning now to FIG. 4, an example of a record is depicted in accordance with an advantageous embodiment of the present invention. As illustrated, record 400 is an example of a record in records 310 within geo-database 304 in FIG. 3. In this illustrative example, record 400 includes element attributes 402.

Element attributes 402, in these examples, include number ID 406, name/designator 408, feature type 410, geocoding 412, and other attributes 414. In these examples, sorting of records within records 312 in geo-database 304 in FIG. 3 may be performed through number ID 406, name/designator 408, and feature type 410. Although name/designator 408, feature type 410, and geocoding 412 are not visible, these types of information are not considered a non-visible element because they do not have an operational relationship with a visible element. In other words, this information does not provide information about a visible element that is useful for the operation of an aircraft or indicate what actions may be taken with respect to the visible element.

When queries are made, sorting and identifications are made through identifying a type of feature in feature type 410. Feature type 410, may, for example, identify the object as a runway feature, a taxiway feature, or a parking stand feature. Number ID 406 may identify the object as a particular type of object within the feature type. If multiple elements or types of elements are present for a particular feature type, then name/designator 408 may be used to sort the records. Number ID 406, in these examples, is unique within the entire data set within records 312.

Geocoding 412 contains the geometric object associated with the element in record 400. These geometries may be, for example, geographic coordinates, such as coordinates expressed in latitude and longitude. When geographic coordinates are used in geocoding 412, these coordinates may define the outline of the particular element in case it is an area element, a line, or a point. The element may be, for example, a runway or a portion of a runway.

Additionally, depending on the particular implementation, other attributes 414 in record 400 also may include a beginning time and an ending time for the complete record or for one or more particular attributes if those elements are temporary ones. In some cases, the period of time may be a permanent one in which a beginning time is present, but no ending time is set. Element attributes 402, in these examples, are information describing the particular element. For example, element attributes 402 also may include an identification of the type of element, such as a runway or taxiway and further data describing this element, such as, for example, the name of the element, material, elevation or status.

Element attributes 402 may include anything about the element that is subject to change. Additionally, this information also may identify the airport at which the element is located. Element attributes 402 also may include non-visible information that has an operational relationship to the element. For example, an element for a runway may include attributes for non-visible information, such as takeoff positions for a runway. Further, information about the runway slope and landing direction also may be associated in the attributes with the runway element. Record 400 may represent an entry for either a visible element or a non-visible element.

In some cases, non-visible elements may be appended as attributes to visible elements. In other implementations, non-visible elements may be represented as separate elements within records 312 in geo-database 304 in FIG. 3. A combination of representing non-visible elements as attributes or separate elements in records 312 may be also used.

The geospatial key received in an update, such as update 306 in FIG. 3, is used to determine whether a particular record corresponds to the geospatial key. For example, if the geospatial key takes the form of a line, the determination may be made as to whether geocoding 412 intersects the line. In another example, the geospatial key may be a polygon. With this type of example, a determination may be made as to whether geocoding 412 intersects the polygon or is entirely encompassed by the polygon to determine whether record 400 should be retrieved for modification. The determination also may be made as to whether geocoding 412 overlaps or touches the geospatial key.

Figure 5:
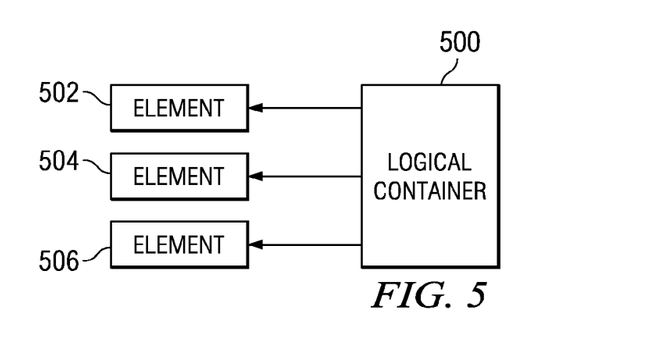
FIG. 5 is a diagram illustrating a logical container in accordance with an advantageous embodiment.

Further, records 312 in geo-database 304 may contain logical containers. Turning now to FIG. 5, a diagram illustrating a logical container is depicted in accordance with an advantageous embodiment. Logical container 500 contains references to elements 502, 504, and 506. Logical container 500 may be a record within records 312 in FIG. 3 that contains pointers to elements 502, 504, and 506. These elements may be different physical elements, which have a logical relationship. For example, elements 502, 504, and 506 may be parts of a runway. Alternatively, these elements may represent parts of a helipad or parking stand.

In particular, if logical container 500 is for a runway, the different elements referenced by logical container 500 may include, for example, runway elements, runway intersections, stop ways, runway markings, painted center lines, arresting gear locations, runway thresholds, runway shoulders, and runway displaced areas. If logical container 500 represents a taxiway, the different elements referenced by logical container 500 may include taxiway elements, taxiway shoulders, taxiway holding positions, taxiway guidance lines, runway exit lines, and taxiway intersection markings as examples.

Additionally, logical container 500 also may include elements for non-visible information about the visible elements. The elements for the non-visible information may include information about takeoff positions, low visibility taxi routes, company specific taxi routes, published parking stand location coordinates (not the ones painted physically on the ground, runway incursion hotspots, apron entry points, colors of stop light bars, lighting systems, parking stand position direction, parking stand push back direction, communication frequency information, run-up positions, slope profile of the runway, runway visual range detectors, underground fuel hydrants, functional parts of buildings (e.g. meteorological office), and areas affected by warning notes (e.g. birdstrikes). This information may be contained within logical container 500 as additional elements. Alternatively, depending on the particular implementation, this type of information may be stored as attributes in the elements in which the operational relationship exists.

In this example, container 500 references elements 502, 504, and 506. These elements, depending on the particular implementation, also may include other logical containers. As a result, logical container 500 may be made up of elements, logical containers, or a combination of elements and logical containers.

Figure 6:
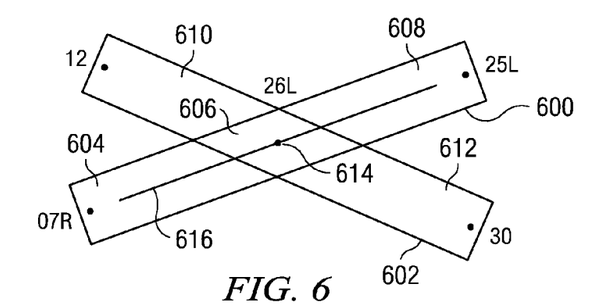
FIG. 6 is a diagram illustrating the grouping of objects into a container in accordance with an advantageous embodiment.

Turning now to FIG. 6, a diagram illustrating the grouping of objects into a container is depicted in accordance with an advantageous embodiment. In this example, runways 600 and 602 are present. Runway 600 includes elements 604, 606, 608. These elements are runway elements. Runway 602 is formed from elements 610, 606, and 612. Element 606 is a common runway element between runways 600 and 602. Additionally, element 614 is present within the area encompassed by element 606. In these examples, element 614 is a non-visible element. In particular element 614 is a threshold that is supposed to be associated with runway 600, rather than runway 602.

In performing grouping of containers, an identification of which runway element 614 is located on is performed. In this example, such a determination cannot be made easily because element 614 is located in a common area between both runways 600 and 602. Element 606 is used to provide for the appropriate identification of various elements within runway 600. Element 606 is used with runway 600 to identify elements that are associated with this runway.

In this example, elements 604, 606, 608, and 614 are all elements that encompass geometric feature 616. The identification of elements 604, 606, 608, and 614 and their relationship with geometric feature 616 may be determined by examining geocoding information for these elements In this example, geometric feature 616 takes the form of line. Other types of geometric features may be used, such as a polygon. As depicted, all elements that encompass or touch geometric feature 616 are identified as belonging to runway 600. Geometric feature 616 may be stored in association with a container for runway 600 to allow for the identification of elements that belong to the container for runway 600. Runway 600 is a logical element that contains different runway elements.

Alternatively, instead of using a geometric feature, such as geometric features 616, other types of additional attributes may be used to identify elements that belong to runway 600. For example, a new attribute with a natural unique key may be placed into objects 604, 606, 608, and 614. For example, a full runway identifier, such as 07R.25L may be used. Such a feature may be implemented if the container for runway 600 has a unique natural key.

Another implementation may involve placing a new attribute into these elements with an artificial key specifying the association of the elements to the particular runway container. This type of approach, however, would require the addition of new information into the database. A final alternative is to store the complete container for runway 600 with all of its associated members in one database.

Figure 7:
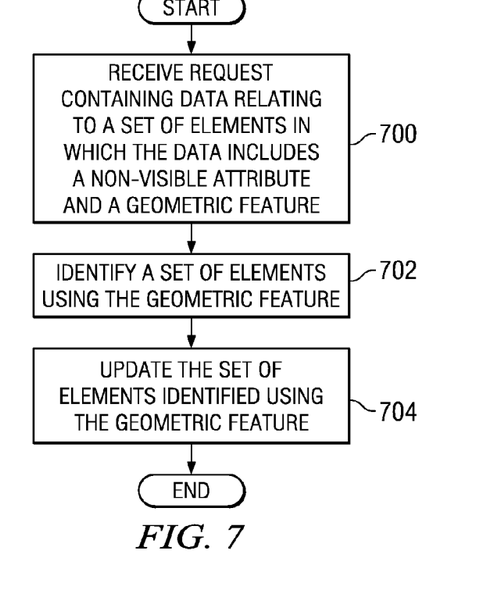
FIG. 7 is a flowchart of a process for managing a geographic information system database is depicted in accordance with an advantageous embodiment.

Turning now to FIG. 7, a flowchart of a process for managing a geographic information system database is depicted in accordance with an advantageous embodiment. In these examples, the geographic information system database is an airport mapping database. The process illustrated in FIG. 7 may be implemented in a process, such as database management system 302 in FIG. 3.

The process in FIG. 7 may be used to manage an airport mapping database in response to changes in elements. Further, the process illustrated in this figure also may be used to add new elements, such as a new parking stand or new surface information for part of a taxiway. The changes made by a request received by the database may be made as part of the creation of the database or to update the database to include new or changed elements. For example, the update requests may be to add non-visible elements to an existing airport mapping database.

The process begins by receiving an update containing data relating to a set of elements in which the data includes a non-visible attribute in a geometric feature (operation 700). In these examples, the set of elements may be objects, such as individual portions of a runway, of all of the components making up a runway. The data relating to a set of elements is operationally related to a set of elements in these advantageous embodiments. In other words, the data provides information about the element to which it is related. The data may give information about the particular element or information on the use of the element. For example, the data may give information about the surface of a taxiway. Alternatively, the data may indicate which direction to turn at an intersection in the taxiway. The set of elements are identified using the geometric feature (operation 702).

Thereafter, the set of elements are updated with the data received in the update (operation 704) with the process terminating thereafter. This updating may take various forms. For example, the update may involve adding or changing attributes in the set of identified elements. Alternatively, the update may include creating a new element in the database containing the attributes. This new element may be referenced or pointed back to the set of elements to which it is related.

Figure 8:
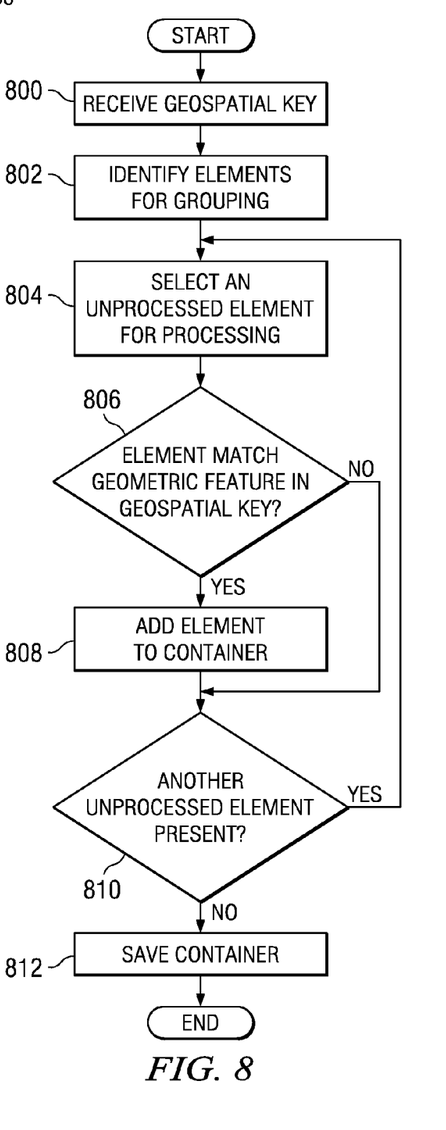
FIG. 8 is a flowchart of a process for logically grouping elements in accordance with an advantageous embodiment.

Turning now to FIG. 8, a flowchart of a process for logically grouping elements is depicted in accordance with an advantageous embodiment. The process illustrated in FIG. 8 may be implemented in a software component, such as database management system 302 in FIG. 3.

The process begins by receiving a geospatial key for a container (operation 800). Thereafter, elements are identified for grouping within the container (operation 802). A first selection of elements for the container may be made in operation 802 by identifying elements of a particular type. For example, if the container is for a taxiway, then all elements that are of this type are selected for processing.

Next, an unprocessed element is selected for processing (operation 804). A determination is made as to whether the selected element matches the geometric feature in the geospatial key (operation 806). For example, if the geometric feature is a polygon, the element may match the geometric feature if the element is contained within the polygon. Depending on the implementation, the element may be required to be contained completely in the polygon or partially in the polygon.

If the element matches the geometric feature, the element is added to the container (operation 808). Thereafter, a determination is made as to whether another unprocessed element is present (operation 810). If another unprocessed element is present, the process returns to operation 804 to select another element for processing. Otherwise, the process saves the container (operation 812) and the process terminates.

With reference again to operation 806, if a determination is made that the element does not match the geometric feature in the geospatial key, the process proceeds to operation 810 as described above.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

Thus, the different advantageous embodiments provide a computer implemented method, apparatus, and computer usable program code for enhancing a geographic information system database with operational data. In the illustrative examples, the geographic information system database is an airport mapping database. A first set of elements are stored in the airport mapping database in which the first set of elements are visible elements and are identified using the set of geometric features. A second set of elements in the airport mapping database are stored in which the second set of elements are non-visible elements and are identified using the set of geometric features. A first element in the first set of elements is associated with the second element in the second set of elements based on an operational relationship between the first element and the second element. A responsive set of elements containing one element from the first set of elements and another element from the second set of elements based on associations between elements in the first set of elements and the second set of elements in response to a query.

In managing a geographic information database, an update may be received containing data relating to a set of elements in which the data contains data relating to a non-visible element in the geometric feature. A set of elements in the geographic information system database may be located using the geometric features. The set of elements are updated with the non-visible element.

As a result, a geo-database developer is able extend the composition of the geo-database to include elements as specified by common industry practice, and as documented in industry standards requirements regarding international aerodrome mapping methodologies, with various modifications as are suited to the particular use contemplated.

In addition, although the depicted illustrations are directed towards a geographic information database in the form of an airport at the database, the different advantageous embodiments may be applied to other types of geographic information databases. One example is that other types of geographic information system databases may implement different advantageous embodiments including, for example, navigation databases, obstacle databases, or any other aeronautical database with geographic context. For example, these features may be applied to a database that provides for the mapping of roadways in a city or state. The different features in the advantageous embodiments also may be applied to the mapping of waterways. Further, the geospatial key may use any sort of geometric feature or combination of geometric features depending on the particular implementation. For example, the geometric key may use the combination of the polygon and a point, or a line and a point. Further, tolerances may be used for features that are not entirely encompassed or exactly by the element.

The description of the present invention has been presented for purposes of illustration and description, and is not intended to be exhaustive or limited to the invention in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the invention, the practical application, and to enable others of ordinary skill in the art to understand the invention for various embodiments with various modifications as are suited to the particular use contemplated.

What is claimed is:

1. A method for enhancing data provided about a visible element in a geographic information system airport mapping database, the method comprising:

storing a record in the geographic information system airport mapping database as documented in industry standards requirements regarding international aerodrome mapping methodologies, wherein the record comprises: a stored container, a stored element, and a stored attribute, wherein the stored element comprises the stored attribute, and further wherein a stored container comprises a linked stored element, and further wherein the geographic information system airport mapping database is in a tangible computer readable medium;

assigning, using a database management system, a first set of stored attributes to the stored element, wherein the first set of stored attributes comprises: an element name; an unique identification number; a location name; a beginning time; an ending time; a type of object; a runway slope; a directional movement command; an operating restriction; an element feature type, wherein the feature type is an object comprising: a runway feature, a taxiway feature, or a parking stand feature; a geocode, wherein the geocode comprises data representing a first geometric object, wherein the first geometric object comprises: a line, a point, a polygon; and, if the stored element is visual, the stored attribute is a non-visible element;

linking, using the database management system, to create the stored container, a set comprising: related stored elements, related stored containers, wherein elements or containers are related when they share a logical relationship comprising: parts of a taxiway, parts of a runway, parts of a parking area, taxi routes, communication frequencies, and operating cautions;

receiving a data input request set to the database management system, wherein the data input request set comprises: a request element, the request element comprising: a request element geocode attribute, a visual element, a non-visual element, an update to the stored element, and an new element, and further wherein the visual element comprises data captured by photogrammertry from imagery;

identifying, using the database management system, all stored elements in the geographic information system airport mapping database comprising a geocode attribute in geospatial relationship with the request element geocode attribute, wherein the geospatial relationship comprises: intersection, overlap, touching, or encompassment of coordinates defining the geometric object of the request element geocode attribute;

associating, using the database management system, a first update request non-visual element to a set of associated stored elements in the geographic information system airport mapping database, wherein the set of associated stored elements comprise a first set of stored visual elements whose stored geocode attribute is in geospatial relationship to the request element geocode attribute of the first update request non-visual element;

appending, using the database management system, the first update request non-visual element to each stored element in the first set of stored visual elements, wherein appending comprises: when the non-visual element has an operational relationship to the visual element, adding the non-visual element as an attribute of the visual element, and linking the non-visual element to each associated visual element, wherein the linking creates or supplements a stored container comprising the set of associated stored elements;

adding, using the database management system, a first request new element to the geographic information system airport mapping database as a new unlinked element in the database when the request element geocode attribute of the first request new element is not in geospatial relationship to the geocode within any stored element in the geographic information system airport mapping database;

accepting a query to the geographic information system airport mapping database management system to provide data about an airport, wherein the query comprises: a query geocode attribute, and a query geospatial relationship;

responsive to the geographic information system airport mapping database management system accepting the query, searching all stored elements and stored containers in the geographic information system airport mapping database to identify a set of presentation elements and containers, wherein the set of presentation elements and containers comprises: elements and containers whose geocode attribute is in the query geospatial relationship with the query geocode attribute; and returning, for presentation in a display, the set of presentation of elements and containers.

2. The method of claim 1, wherein the first set of stored attributes further comprises a natural unique key.

3. The method of claim 1, wherein the first set of stored attributes further comprises an artificial key.

4. The method of claim 1, wherein directional movement command indicates which direction to turn at an intersection in a taxiway.

5. The method of claim 1, wherein the visible element is one of a runway, a taxiway, an intersection, a parking stand, and a helipad.

6. The method of claim 1, wherein the non-visible element has an operational relationship to the visible element.

7. The method of claim 1, wherein the non-visible element is one of a runway incursion hotspot, a surface information, a threshold, a parking stand position direction, a parking stand push back direction, an allowed turn, and a color of a stop light bar.

8. The method of claim 1, wherein the stored container is for a runway.

9. The method of claim 8, wherein the stored container references a stored element that is one of a runway element, a runway intersection, a stop way, a runway marking, a painted center line, an arresting gear location, a runway threshold, a runway shoulder, and a runway displaced area.

10. The method of claim 1, wherein the stored container includes the non-visible element for one of a takeoff position, a low visibility taxi route, a company specific taxi route, published parking stand location coordinates, a runway incursion hotspot, an apron entry point, a color of a stop light bar, a lighting system, a parking stand position direction, a parking stand push back direction, communication frequency information, a run-up position, a slope profile of the runway, a runway visual range detector, an underground fuel hydrant, a functional part of buildings, and an area affected by a warning note.

* * * * *